United States Patent
Wölk et al.

(10) Patent No.: US 9,579,631 B2
(45) Date of Patent: *Feb. 28, 2017

(54) PROCESS FOR THE PREPARATION OF NANOCRYSTALLINE METAL OXIDES

(75) Inventors: Hans Jörg Wölk, Rosenheim (DE); Götz Burgfels, Bad Aibling (DE); Sigrun Polier, Bruckmühl (DE); Gernot Polier, Bruckmühl (DE); Astrid Polier, Bruckmühl (DE)

(73) Assignee: Sued-Chemie IP Gmbh & Co. KG, Munich (DE)

( * ) Notice: Subject to any disclaimer, the term of this patent is extended or adjusted under 35 U.S.C. 154(b) by 174 days.

This patent is subject to a terminal disclaimer.

(21) Appl. No.: 12/373,440

(22) PCT Filed: Jul. 11, 2007

(86) PCT No.: PCT/EP2007/006158
§ 371 (c)(1),
(2), (4) Date: Aug. 26, 2009

(87) PCT Pub. No.: WO2008/006565
PCT Pub. Date: Jan. 17, 2008

(65) Prior Publication Data
US 2009/0325794 A1    Dec. 31, 2009

(30) Foreign Application Priority Data
Jul. 13, 2006 (DE) .................. 10 2006 032 452

(51) Int. Cl.
B01J 23/06      (2006.01)
B01J 23/34      (2006.01)
B01J 23/80      (2006.01)
B01J 23/889     (2006.01)
B01J 21/04      (2006.01)
B01J 21/06      (2006.01)
B01J 21/12      (2006.01)
B01J 23/00      (2006.01)
B01J 23/10      (2006.01)
B01J 35/00      (2006.01)
B01J 37/00      (2006.01)
B01J 37/08      (2006.01)
B82Y 30/00      (2011.01)
C01B 13/14      (2006.01)
(Continued)

(52) U.S. Cl.
CPC ............. B01J 21/04 (2013.01); B01J 21/063 (2013.01); B01J 21/066 (2013.01); B01J 21/12 (2013.01); B01J 23/002 (2013.01); B01J 23/06 (2013.01); B01J 23/10 (2013.01); B01J 23/80 (2013.01); B01J 35/0013 (2013.01); B01J 37/0045 (2013.01); B01J 37/0054 (2013.01); B01J 37/0072 (2013.01); B01J 37/08 (2013.01); B82Y 30/00 (2013.01); C01B 13/14 (2013.01); C01B 13/145 (2013.01); C01B 13/34 (2013.01); C01F 7/02 (2013.01); C01F 7/021 (2013.01); C01F 7/30 (2013.01); C01G 1/02 (2013.01); C01G 9/006 (2013.01); C01G 23/047 (2013.01); C01G 25/02 (2013.01); C01G 45/006 (2013.01); B01J 35/1014 (2013.01); B01J 35/1019 (2013.01); B01J 2523/00 (2013.01); C01P 2002/60 (2013.01); C01P 2004/32 (2013.01); C01P 2004/34 (2013.01); C01P 2004/64 (2013.01); C01P 2006/12 (2013.01); C01P 2006/16 (2013.01); C01P 2006/17 (2013.01)

(58) Field of Classification Search
CPC ........ B01J 21/04; B01J 21/063; B01J 21/066; B01J 21/12; B01J 23/002; B01J 23/06; B01J 23/10; B01J 23/80; C01B 13/14; C01B 13/145; C01B 13/24; C01B 13/34
USPC ...... 423/23, 539.1, 598, 599, 600, 604, 608, 423/610; 502/102, 103, 113, 129, 132, 502/300, 324, 345, 349, 350
See application file for complete search history.

(56) References Cited

U.S. PATENT DOCUMENTS 7,358,212 B2     4/2008  Remke
2004/0077481 A1  4/2004  Remke et al.
(Continued)

FOREIGN PATENT DOCUMENTS

DE   101 09 892 A1    9/2002
DE   102004044266     3/2006
(Continued)

OTHER PUBLICATIONS

Fischer (NSTI—Nanotech 2006, 3:308-311).*
(Continued)

Primary Examiner — Jun Li
(74) Attorney, Agent, or Firm — RatnerPrestia

(57) ABSTRACT

The present invention relates to a process for the preparation of nanocrystalline metal oxide particles comprising the steps of a) the introduction of a starting compound into a reaction chamber by means of a carrier fluid, b) the subjecting of the starting compound in a treatment zone to a pulsating thermal treatment, c) the forming of nanocrystalline metal oxide particles, d) the removal of the nanocrystalline metal oxide particles obtained in steps b) and c) from the reactor, wherein the starting compound is introduced into the reaction chamber in the form of a solution, slurry, suspension or in solid aggregate state. Further, the present compound relates to a catalyst material, obtainable by the process according to the invention, in particular a catalyst material for use in the preparation of methanol from carbon monoxide and hydrogen.

9 Claims, No Drawings

(51) Int. Cl.
| | |
|---|---|
| *C01B 13/34* | (2006.01) |
| *C01F 7/02* | (2006.01) |
| *C01F 7/30* | (2006.01) |
| *C01G 1/02* | (2006.01) |
| *C01G 9/00* | (2006.01) |
| *C01G 23/047* | (2006.01) |
| *C01G 25/02* | (2006.01) |
| *C01G 45/00* | (2006.01) |
| *B01J 35/10* | (2006.01) |

(56) References Cited

U.S. PATENT DOCUMENTS

| | | |
|---|---|---|
| 2005/0152832 A1 | 7/2005 | Ying |
| 2006/0051288 A1* | 3/2006 | Tsurumi ............ B82Y 30/00 423/608 |
| 2006/0166057 A1* | 7/2006 | Kodas et al. .............. 429/22 |

FOREIGN PATENT DOCUMENTS

| | | |
|---|---|---|
| EP | 1 142 830 A1 | 10/2001 |
| EP | 1227139 | 7/2002 |
| JP | 4357117 | 12/1992 |
| JP | 9175812 | 7/1997 |
| JP | 2005320189 | 11/2005 |
| WO | WO 02/072471 A2 | 9/2002 |
| WO | 2004005184 | 1/2004 |
| WO | 2004041427 | 5/2004 |
| WO | 2005070819 | 8/2005 |
| WO | 2005087660 | 9/2005 |
| WO | WO 2006/027270 A2 | 3/2006 |

OTHER PUBLICATIONS

T. Grygar et al., "Voltammetric and X-ray Diffraction Analysis of the Early Stages of the Thermal Crystallization of Mixed Cu,Mn Oxides", J. Solid State Electrochem, vol. 8 (2004) pp. 252-259.

G. P. Vissokov, "Thermodynamic and Model Studies on the Plasmachemical Preparation of Nanostructured Catalysts for Low-Temperature Water-Gas Shift Reaction", Bulgarian Chemical Communications, vol. 34, No. 3 /4 (2002) pp. 310-320.

International Search Report dated Feb. 21, 2008.

R. Schlogl et al., Angewandte Chemie 116, 1628-1637 (2004).

Translation of Japanese Office Action in Japanese Application No. 2013-219575 mailed Nov. 4, 2014.

* cited by examiner

PROCESS FOR THE PREPARATION OF NANOCRYSTALLINE METAL OXIDES

The present invention relates to a process for the preparation of nanocrystalline metal oxides plus nanocrystalline metal oxides prepared according to the inventive process and their use as catalysts, in particular for the preparation of methanol from carbon monoxide and hydrogen.

Metal oxides, in particular mixed metal oxides, have a wide field of use, such as for example in ceramics, polymer additives, fillers, pigments, reactive surfaces, catalysts, etc.

In particular, metal oxides are also used as catalysts, for example in the field of catalytic converters in cars, in the preparation of photocatalysts, for example titanium dioxide or doped titanium dioxides, and for the preparation of oxidic catalysts, in particular for the preparation of methanol. Here, the process of calcining the catalyst starting materials during the preparation processes substantially influences the quality of the final catalysts.

The targeted control of the crystallization process can be influenced by the composition of the educt(s). Here, one important factor in particular is the crystallite size in various catalyst systems (R. Schlögl et al., Angewandte Chemie 116, 1628-1637 (2004)).

Increasingly, so-called "nanocrystalline" powders are being taken into consideration, despite the often unresolved preparation problems.

Nanocrystalline oxide powders have thus far usually been prepared either by chemical synthesis, by mechanical processes or by so-called thermophysical processes. In the case of perovskites e.g. BET surface areas of 2-10 $m^2/g$ are achieved with the conventional processes.

Typically, nanocrystalline powders are prepared by chemical reactions during the chemical synthesis starting from so-called precursor compounds, for example by means of hydroxide precipitation, synthesis by hydrolysis of organometallic compounds and hydrothermal processes. The final structure of the nanocrystallites is typically achieved only after the calcination.

Mechanical preparation processes are usually characterized by intensive grinding of inhomogeneous particles to form homogeneous particles, which often also leads to undesired phase transformations to the point where particles become amorphous due to the pressure exerted on the particles.

Disadvantageously, the particles formed in the process are not present in a uniform size distribution. Moreover, there is the risk of abrasion by the grinding tools and thus of a contamination of the products, which is disadvantageous in particular in the field of catalyst technology.

Thermophysical methods, such as are described for example in WO 2004/005184, are based on the introduction of thermal energy into solid, liquid or gaseous starting compounds. This international patent application relates in particular to the so-called plasma-pyrolytic spray process (PSP), in which the starting materials are atomized in an oxyhydrogen flame and broken down. A typical technical application is the preparation of silicon dioxide in which volatile silicon compounds are atomized in an oxyhydrogen flame.

Furthermore, in the synthesis of nanocrystalline particles the so-called plasma synthesis process is used in which the starting substances are vaporized in a plasma with a temperature of up to 6,000 K. Further customary processes are for example CVD processes, in which gaseous educts are reacted, wherein non-oxidic powders typically form.

However, the aforementioned processes of the state of the art have disadvantages relating to the presence of too broad a particle-size distribution, undesirable agglomeration of the particles with one another or incomplete phase changes.

The object of the present invention was therefore to provide a process for the preparation of nanocrystalline powders the distribution of which is as monomodal as possible which avoids the aforementioned disadvantages of the state of the art, in particular the undesirable phase changes, makes possible an adjustable nanocrystalline particle size and provides particles with specific inner surface area and defined crystal structure.

This object is achieved according to the invention by a process for the preparation of nanocrystalline metal oxide particles comprising the steps of:
  a) the introduction of a starting compound into a reaction chamber by means of a carrier fluid,
  b) the subjecting of the starting compound in a treatment zone to a pulsating thermal treatment of a pulsating flow (also called "pulsating thermal treatment"),
  c) the forming of nanocrystalline metal oxide particles,
  d) the removal of the nanocrystalline metal oxide particles obtained in steps b) and c) from the reactor,
wherein the starting compound is introduced into the reaction chamber in the form of a solution, slurry, suspension or in solid state.

Surprisingly, it was found that the process can be carried out at relatively low temperatures of from 240° to 700° C., particularly preferably from 240° to 600° C., in other variants from 340° to 680° C. In further specific embodiments (direct supply of powder) the temperature was <300° C. Hitherto, preferred temperatures of more than 700° C., and even up to 1400° C. were known from the state of the art.

Very particularly surprisingly, it was found that through the process according to the invention the crystallization process can be controlled in a targeted manner, in particular the size of the crystallites and the pore-size distribution of the corresponding metal oxides. This can also be further advantageously influenced by the residence time in the flame or by the reactor temperature. Through the pulsating thermal treatment, the nanocrystalline particles that form are prevented from agglomerating. Typically the nanocrystalline particles are immediately conveyed by the stream of hot gas into a colder zone where nanocrystallites are obtained, some with diameters of less than 20 nanometres.

In the case of the nanocrystallites obtained according to the invention, this leads to clearly increased BET surface areas. There may be mentioned by way of example the group of perovskites which have a BET surface area of approximately 2-10 $m^2/g$ for nanocrystalline perovskites in conventional synthesis processes, whereas the process according to the invention leads to perovskite nanocrystallites with a BET surface area of 100-200 $m^2/g$. Further, through the use of aluminium tri-sec-butylate as starting material, $\gamma$-$Al_2O_3$ with a specific surface area of 40-150 $m^2/g$ and a particle size of 20-40 nm was obtained. Mullite prepared according to the invention had a BET value of 12-14 $m^2/g$ with a $D_{50}$ value of 2 μm.

Very generally, further substantial advantages of the process according to the invention are that, for example, suspensions can usually be calcined within a very short period, typically within a few milliseconds, at comparatively lower temperatures than with processes of the state of the art, without additional filtration and/or drying steps or without the addition of additional solvents. The nanocrystallites that form have significantly increased BET surface areas, which in the case of catalytically active materials leads to catalysts with increased reactivity, improved conversion and selectivity. The nearly identical residence time of every particle in the homogeneous temperature field created by the process results in an extremely homogeneous end-product with a narrow monomodal particle distribution.

A device for carrying out the process according to the invention in the preparation of monomodal nanocrystalline metal oxide powders of this kind is known for example from DE 10109892 A1. Unlike the device described there and the process disclosed there, the present process does not, however, require a preceding evaporation step in which starting materials are heated to an evaporation temperature.

Typically, the materials from which the metal oxide powders according to the invention are prepared are directly introduced into the so-called reaction chamber, more precisely into the combustion chamber, via a carrier fluid, in particular a carrier gas, preferably an inert carrier gas, such as for example nitrogen, etc. Attached exhaust side to the reaction chamber is a resonance tube with a flow cross-section which is clearly reducing compared with the reaction chamber. The floor of the combustion chamber is equipped with several valves for the entry of the combustion air into the combustion chamber. The aerodynamic valves are fluidically and acoustically matched with the combustion chamber and the resonance tube geometry such that the pressure waves, created in the combustion chamber, of the homogeneous "flameless" temperature field spread pulsating predominantly in the resonance tube. A so-called Helmholtz resonator with pulsating flow is formed with a pulsation frequency between 10 and 150 Hz, preferably 30 to 110 Hz.

Material is typically fed into the reaction chamber either with an injector or with a suitable two-component jet or in a Schenk dispenser.

The process according to the invention makes possible the preparation of monomodal, nanocrystalline oxide powders by direct introduction. Surprisingly, oxide powders can also be introduced directly into the combustion chamber without the crystalline materials that form needing to be filtered. Furthermore, the process according to the invention makes it possible for lower temperatures to be used in the preparation of the metal oxides according to the invention than in the state of the art, with the result that a tendency for possible surface reductions of the resulting products due to the use of very high temperatures of <1000° C. is avoided. Moreover, when using solutions of metal salts, an additional precipitation step can be avoided, with the result that these can be calcined directly in the reactor.

The carrier fluid is preferably a carrier gas, such as for example air, nitrogen or air/nitrogen mixtures. Naturally, a liquid, or even starting materials already present in solution, can alternatively also be used as fluid. The type of carrier fluid has influence in particular on the residence time in the treatment zone. Thus for example suspensions and slurries of poorly soluble compounds such as sulphates, oxides, nitrides, etc., can also be used directly according to the invention.

Preferably, the starting compound is introduced into the reaction chamber in atomized form, with the result that a fine distribution in the region of the treatment zone is guaranteed.

It is advantageous if different starting compounds are used which are in particular different from one another in order to be able to also prepare complex metal oxides or mixed oxides. This is advantageous in particular if more complex catalyst systems which are based on the synergy of different metal oxides are to be prepared.

The crystallite size can also be decisively determined by controlling the pulsation (regular or irregular or the duration and amplitudes of the pulsating thermal treatment) and the residence time of the starting compound(s) in the treatment zone (typically from 200 ms to 2 s), the crystallite size can also be decisively determined. Typical crystallite sizes are between 5 and 100 nm at pulsation frequencies of 30 to 110 Hz.

After the thermal treatment, the nanocrystalline metal oxides that have formed are, if possible, immediately transferred into a colder zone of the reaction chamber by means of the carrier fluid, with the result that they are precipitated in the colder zone and can be removed. The yield of the process according to the invention is almost 100%, as all of the product that forms can be removed from the reactor.

As already stated above, it was surprisingly found that oxides already present in solid form can also be used as starting materials which according to the invention are converted into nanocrystalline particles by the subsequent pulsating temperature treatment. Advantageously, this opens up a particularly wide field of use of the process according to the invention, since it is not necessary to select specific starting compounds, for example in respect of their solubility and evaporation, which may optionally be used. It is equally possible that soluble metal compounds are used as starting compound in preferred developments of the process according to the invention. Starting compounds that are particularly readily available, such as the metal nitrates, chlorides, acetates, etc. of metals or transition metals, can be used.

Surprisingly, it was found that the thermal treatment can be carried out at temperatures of 240 to 700° C., which is advantageous in comparison to the previously known thermal decomposition processes which are usually carried out at temperatures of more than 1000° C. There is also less danger of decomposition and secondary reactions which can lead to contaminations of the product, and the energy balance is also more favourable when the process according to the invention is carried out, since energy consumption is lower.

Typically, the process is carried out at a pressure between 15 and 40 bar.

In addition to the process according to the invention, the object of the present invention is also achieved by the nanocrystalline metal oxide material which can be obtained by the process according to the invention. It was found that the nanocrystalline metal oxide material according to the invention preferably has a crystallite size in the range from 5 nanometres to 100 μm, preferably 10 nanometres to 10 μm, very particularly preferably 10 to 100 nm, which, as already stated above, can preferably be adjusted by the pulsation of the thermal treatment.

In very particularly preferred embodiments the crystalline metal oxide material according to the invention is a mixed oxide comprising copper, zinc and aluminium oxide or copper manganese and aluminium oxide, as preferably used as catalyst in the synthesis of methanol from CO and hydrogen. Further preferred metal oxides are non-doped and doped perovskites, spinels and further multicomponent systems.

The process according to the invention is described in more detail with reference to the following embodiment examples, which are not to be regarded as limitative. The device used corresponds largely to that described in DE 10109892 A1, with the difference that the device used for carrying out the process according to the invention did not include a preliminary evaporator step.

EXAMPLES

General

Variant 1

Direct Feed of Spray-Dried Powder into the Reaction Chamber

The optionally spray-dried powder comprising metal oxides was fed by means of a Schenk dispenser. The residence time of the powder in the reactor was between 510 and 700 ms. A feed quantity of approximately 10 kilogrammes per hour was chosen. The temperatures were between 245° C. and 265° C.

Variant 2

Feed of Suspensions

Aqueous suspensions (30% solids content) were prepared from two filter cakes of a precipitated starting product and the suspensions were sprayed into the combustion chamber of the reactor by means of a two-component nozzle. The process was carried out at temperatures of 460° C. to 680° C.

Before being introduced into the reactor space, the suspensions were separated from non-dissolved residues by means of a screen.

Variant 3

Injection of a Solution

An aqueous solution (approx. 40%) of Cu—Zn—Al formate (alternatively Cu—Mn—Al formate) was sprayed into the combustion chamber by means of a Schlick nozzle. A temperature range of 350° C. to 460° C. was chosen for carrying out the process according to the invention. It was further found that even lower concentrations (10 to 30%) of the corresponding solution could be used. The BET surface area of the material was between 60 (Cu/Mn/Al mixed oxide) and 70 $m^2/g$ (Cu/Zn/Al mixed oxide). In the case of Cu/Zn/Al mixed oxides prepared conventionally by the "wet-chemical" process the BET surface area was between 15 and 35 $m^2/g$. The pore-volume distribution of the material according to the invention is shown in Table 1.

An amorphous nanocrystalline monomodal material was always obtained in all variants.

TABLE 1

Pore-size distribution of Cu/Zn/Al mixed oxide according to the invention (BET: 70 $m^2/g$)

| Pore radius (nm) | Pore-volume distribution in % |
|---|---|
| 7500-875 | 0.83 |
| 875-40 | 9.42 |
| 40-7 | 67.27 |
| 7-3.7 | 22.48 |

As can be seen from Table 1, the product that has formed has an almost monomodal distribution of pore radii, wherein the majority of the pore radii are in a range of 40 to 7 nm.

Example 1

By using different starting materials, it is also possible to obtain different powder properties, for example in respect of the BET surface area and the particle size, in the nanocrystalline powders obtainable by means of the process according to the invention.

Table 2 shows powder properties of aluminium oxide which was obtained starting from different starting materials.

TABLE 2

Powder properties of $Al_2O_3$ when using different starting materials

| Starting material | Empirical formula | Specific surface area $m^2/g$ | XRD corundum D = 2.088 Å cps | Particle size nm |
|---|---|---|---|---|
| Al alkoxide | $Al(C_4H_9O)_3$ | 53 | 33 | 0.5-50 |
| Al chloride | $AlCl_3$ | 81 | 3 | 5-100 |
| Al nitrate | $Al(NO_3)_3$ * $9H_2O$ | 17 | 56 | 5-75 |
| "Pseudo" boehmite | $AlO(OH)$ * $H_2O$ | 11 | 286 | 300-500 |
| Gibbsite | $Al(OH)_3$ | 26 | 419 | 60-100 |
| Al oxide | $Al_2O_3$ | 55 | 12 | 30-50 |

Properties of nanocrystalline powders obtained by means of the process according to the invention are shown in Table 3 for different metal oxides.

TABLE 3

Properties of different nanocrystalline powders

| Product | $TiO_2$ | $Al_2O_3$ | ZnO | $ZrO_2$ | $ZrO_2$—$Y_2O_3$ |
|---|---|---|---|---|---|
| Particle size (nm) | 5 ... 50 | 5 ... 75 | 50 ... 100 | 10 ... 50 | 10 ... 50 |
| Morphology | spherical | spherical | spherical | spherical | hollow spheres |
| Crystal phase | rutile 80% anatase 20% | γ-α-$Al_2O_3$ | zincite | mixed phase tetragonal/ monoclinic | tetragonal |
| Specific surface area (BET) ($m^2/g$) | 25 | 50 ... 150 | 19 | 14 | 10 |

BET values for the products in Table 2 which were prepared by conventional processes (wet-chemical precipitation and calcining) were measured as follows:

$TiO_2$: 15-17 m²/g
$Al_2O_3$: 30-40 m²/g
ZnO: 1.0-1.5 m²/g
$ZnO_2$: 1-1.8 m²/g
$ZnO_2/Y_2O_3$: 0.5-1.5 m²/g

This clearly shows that oxides with a particularly large BET surface area can be prepared by means of the process according to the invention.

The invention claimed is:

1. Process for the preparation of nanocrystalline metal oxide particles comprising the steps of
   a) the introduction of a starting compound into a combustion chamber of a reactor by means of a carrier fluid, the reactor comprising the combustion chamber and a resonance tube, wherein the resonance tube is attached to an exhaust side of the combustion chamber,
   b) the subjecting of the starting compound in a treatment zone of the combustion chamber to a thermal treatment of a pulsating flow at a temperature of 240 to 600° C., wherein the starting compound has a residence time in the treatment zone of 200 milliseconds to 2 seconds,
   c) the forming of nanocrystalline metal oxide particles,
   d) the removal of the nanocrystalline metal oxide particles obtained in steps b) and c) from the reactor,
   characterized in that the starting compound is introduced into the combustion chamber in the form of a solution, slurry, suspension or in solid aggregate state.

2. Process according to claim 1, characterized in that the carrier fluid is a gas.

3. Process according to claim 1, characterized in that the starting compound is introduced into the combustion chamber in atomized form.

4. Process according to claim 1, characterized in that one or more starting compounds are used which are identical to or different from one another.

5. Process according to claim 4, characterized in that the pulsation of the pulsating flow is regular or irregular.

6. Process according to claim 1, characterized in that after the thermal treatment in the treatment zone, the nanocrystalline metal particles that have formed are transferred into a colder zone of the reactor.

7. Process according to claim 6, characterized in that a metal oxide is used as starting material.

8. Process according to claim 6, characterized in that a soluble metal compound is used as starting compound.

9. Process according to claim 1, characterized in that the process is carried out at a pressure between 15-40 bar.

* * * * *